United States Patent [19]

Hoblingre et al.

[11] Patent Number: 5,477,744

[45] Date of Patent: Dec. 26, 1995

[54] POSITION ADUSTABLE STEERING COLUMN ASSEMBLY FOR A MOTOR VEHICLE

[75] Inventors: André Hoblingre; Ghislain Passebecq; Jean-Philippe Salez, all of Valentigney, France

[73] Assignee: Equipments et Composants pour l'Industrie Automobile, Audincourt, France

[21] Appl. No.: 123,210

[22] Filed: Sep. 20, 1993

[30] Foreign Application Priority Data

Sep. 28, 1992 [FR] France .................................... 92 11545

[51] Int. Cl.$^6$ .............................. B62D 1/18; F16H 19/04
[52] U.S. Cl. .......................... 74/493; 74/89.17; 74/89.18; 280/775
[58] Field of Search .............................. 74/89.17, 89.18, 74/493; 280/775

[56] References Cited

U.S. PATENT DOCUMENTS

| | | | |
|---|---|---|---|
| 4,541,298 | 9/1985 | Strutt | 74/493 |
| 4,691,587 | 9/1987 | Farrand et al. | 74/493 |

FOREIGN PATENT DOCUMENTS

| | | | |
|---|---|---|---|
| 444994 | 2/1991 | European Pat. Off. | |
| 461025 | 12/1991 | European Pat. Off. | 74/493 |
| 477509 | 4/1992 | European Pat. Off. | |
| 2255204 | 7/1975 | France | |
| 3737164 | 5/1989 | Germany | |
| 63-134372 | 6/1988 | Japan | 280/775 |
| WO88/10205 | 12/1980 | WIPO | 74/493 |

*Primary Examiner*—Allan D. Herrmann
*Attorney, Agent, or Firm*—Sughrue, Mion, Zinn, Macpeak & Seas

[57] ABSTRACT

This assembly, including a support structure provided with two flanges, a steering shaft including two portions, one carrying the steering wheel and the other connected to the rest of the steering mechanism and which are mounted telescopically one in the other, this shaft being capable of rotating in a body pivoting between the two flanges and including two portions which can be moved slidingly one in the other, one (7a) of them including a device for rotationally guiding and for axially blocking the shaft portion which carries the steering wheel, and the other being articulated between the flanges, and mechanisms with gear motors for adjusting the angular and axial positions of the steering wheel, which mechanisms are adapted to interact with the support structure and the body portion (7a) associated with the shaft portion which carries the steering wheel, is characterized in that the adjusting mechanisms have a structure (14) for suspending the body portion (7a) which is articulated on the support structure and capable of moving angularly by the corresponding gear motor, this body portion (7a) and this suspension structure (14) being capable of moving angularly and/or in translation, one with respect to the other.

24 Claims, 5 Drawing Sheets

POSITION ADUSTABLE STEERING COLUMN ASSEMBLY FOR A MOTOR VEHICLE

BACKGROUND OF THE INVENTION

The present invention relates to a position-adjustable steering column assembly, particularly for a motor vehicle.

More particularly, the invention relates to steering column assemblies with so-called electrical adjustment, that is to say, for example, by the agency of electric gear motor means, as opposed to steering column assemblies with so-called manual adjustment.

These steering column assemblies with so-called electrical adjustment allow a user to adjust the angular position and the axial position of a steering wheel, for example by acting on control members controlling the operation of the gear motors for moving the column assembly and therefore the steering wheel.

In the state of the art there is already known, for example from document EP-A-0,444,994 in the name of the Applicant Company, such a steering column assembly which includes a column support structure provided with two more-or-less vertical lateral flanges, and a steering shaft including two portions, one of which carries the steering wheel and the other of which is connected to the rest of the mechanism for steering the vehicle and which portions are mounted telescopically one in the other, so as to allow the adjustment of the axial position of the steering wheel, this shaft being mounted so that it can rotate in a column body capable of pivoting about a more-or-less horizontal axis between the two flanges of the support structure so as to allow the adjustment of the angular position of the steering wheel.

This body includes two portions which can be moved slidingly one in the other, one of which includes means for rotationally guiding and for axially blocking the shaft portion which carries the steering wheel and the other of which is articulated between the flanges of the support structure.

This assembly also includes means comprising an electric gear motor for adjusting the angular position of the steering wheel, and an electric gear motor for adjusting the axial position of the steering wheel, which are adapted so as to interact, on the one hand, with the support structure and, on the other hand, with the body portion associated with the shaft portion which carries the steering wheel, in order to allow the adjustment of the angular and axial positions of the steering wheel.

These electrical gear motors may be operated, for example, by the user, through the agency of control members arranged on the steering wheel or on the dashboard of the vehicle or through a control unit comprising means for memorizing these positions.

The axial movement of the body portion associated with the shaft portion which carries the steering wheel is provided, in the assembly described in this prior document, through the agency of a rack-pinion mechanism. The pinion is rotationally driven in one direction or the other by one of the electric gear motors in order to give rise to a linear movement of the rack, this rack also being connected to the corresponding body portion, so as to allow the adjustment of the axial position of the latter and therefore of the steering wheel.

The angular movement of this body portion, and therefore of the steering wheel, is provided by means of the other electric gear motor, also including an output pinion adapted to interact with a rack for moving means for suspending this column body portion, along inclined ramps of the lateral flanges of the support structure, so as to allow an adjustment of the angular position of this body, portion and therefore of the steering wheel.

However, this configuration, and in particular that of the means for adjusting the angular position of the steering wheel, are relatively complicated, because this angular position adjustment requires, on the one hand, the conversion of a rotational motion of the output shaft of the gear motor into a linear movement of the rack and, on the other hand, the conversion of the linear movement of the rack into an angular movement of the corresponding body portion.

There is also known, for example from document U.S. Pat. No. 4,691,587, another embodiment of a steering column assembly with so-called electric adjustment. In this assembly, the steering shaft is arranged in a column body fixed onto an intermediate support structure including means with a gear motor for adjusting the axial position of this body.

This intermediate support structure is mounted so that it can move angularly with respect to a support structure connected to the rest of the vehicle, by virtue of a operating lever which is articulated on the support structure and adapted to interact with movement means, the operation of which is controlled by other means with an adjustment gear motor, which other means are also articulated on the support structure.

However, it can be understood that this configuration is relatively complicated, bulky and has extremely high weight and cost price which are both very high.

SUMMARY OF THE INVENTION

The object of the invention is therefore to solve these problems by providing a steering column assembly with so-called electric adjustment, which is simple, reliable, whose bulk and weight are as low as possible, whilst allowing accurate adjustment of the steering wheel in angular and axial positions.

To this end, the subject of the invention is a position-adjustable steering column assembly, particularly for a motor vehicle, of the the including a column support structure provided with two more-or-less vertical lateral flanges, a steering shaft including two portions, one of which carries the steering wheel and the other of which is connected to the rest of the mechanism for steering the vehicle and which portions are mounted telescopically one in the other, so as to allow adjustment of the axial position of the steering wheel, this shaft being mounted so that it can rotate in a column body capable of pivoting about a more-or-less horizontal axis between the two flanges of the support structure so as to allow the adjustment of the angular position of the steering wheel, this body including two portions which can be moved slidingly one in the other, one of which includes means for rotationally guiding and for axially blocking the shaft portion which carries the steering wheel and the other of which is articulated between the flanges of the support structure, and position-adjusting means including an electric gear motor for adjusting the angular position of the steering wheel, and an electric gear motor for adjusting the axial position of the steering wheel, which are adapted so as to interact, on the one hand, with the support structure and, on the other hand, with the body portion associated with the shaft portion, which carries the steering wheel, in order to adjust the angular and axial positions of the steering wheel, characterized in that the adjustment means further comprise a structure for suspending the said body portion associated with the shaft portion which carries the steering wheel, which portion is articulated about a more-or-less horizontal axis on the support structure and capable of moving angularly under the control of movement means interacting with the electric gear motor for adjusting the angular position of the steering wheel, in order to adjust the angular position of the body portion associated with the shaft portion which carries the steering wheel, this body portion and this suspension structure being capable of moving angularly and/or in translation one with respect to the other, in order to allow an angular and/or axial adjustment of the position of the corresponding portion of the body, and therefore of the steering wheel, by activating one and/or the other of the said gear motors.

The invention will be better understood with the aid of the description which will follow, given solely by way of example and made with reference to the appended drawings, in which:

Figure 1:
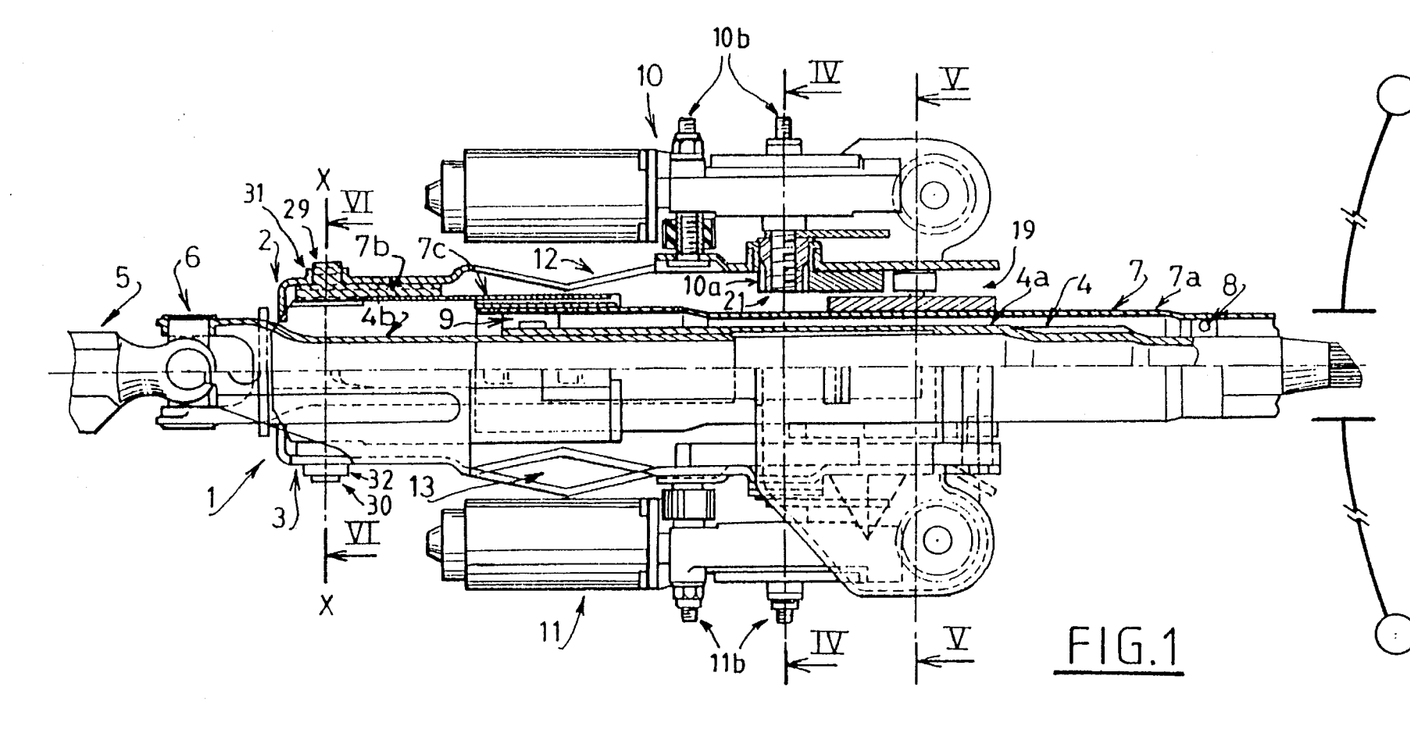
FIG. 1 represents a partially sectioned plan view of a steering column assembly according to the invention.

As can be seen in these FIGS. and in particular in FIG. 1, the steering column assembly according to the invention has an overall configuration which exhibits some similarities with that of the assembly described in document EP-A-0,444,994 mentioned previously.

Indeed, this steering column assembly includes a column support structure, denoted generally by the reference 1, provided with two more-or-less vertical lateral flanges, denoted by the references 2 and 3.

Moreover, this column assembly includes a steering shaft denoted by the reference 4, including two portions 4a and 4b one 4a of which is adapted to receive the steering column (not shown) and the other 4b of which is connected to the rest 5 of the mechanism for steering the vehicle, for example through the agency of a cardan joint 6.

These two shaft portions 4a and 4b are mounted telescopically one in the other, so as to allow the adjustment of the axial position of the steering wheel W, as will be described in more detail hereafter.

Moreover, the shaft 4 is mounted so as to rotate in a casing tube which will also be termed hereafter column body 7, capable of pivoting about a more-or-less horizontal axis X—X, between the two flanges 2 and 3 of the support structure 1, so as to allow the adjustment of the angular position of the steering wheel.

This body also includes two portions which can move slidingly one in the other, one of which, denoted by the reference 7a, includes means 8, 9 for rotationally guiding and for axially blocking the shaft portion 4a which carries the steering wheel and the other of which, denoted by the reference 7b, is articulated between the flanges 2 and 3 of the support structure.

It will be noted that this body portion 7b which is articulated between the flanges of the support structure 1 may consist of a bearing block for guiding and articulating the other body portion, as will be described in more detail hereafter.

The means 8, 9 for rotationally guiding and for axially blocking the shaft portion which carries the steering wheel in the corresponding column body portion 7a, may consist of any suitable means such as, for example, a ball bearing and a needle bearing respectively.

Moreover, this column assembly also includes position-adjusting means comprising a first electric gear motor 10 for adjusting the axial position of the steering wheel and a second electric gear motor 11 for adjusting the angular position of the steering wheel, these gear motors being adapted to interact, on the one hand, with the support structure 1, and on the other hand, with the body portion 7a associated with the shaft portion 4a which carries the steering wheel, so as to provide the positional adjustment of this body portion and therefore of the steering wheel.

These means with gear motors for position adjustment are, for example, irreversible, that is to say that the position of the steering wheel cannot be changed by action on the steering wheel.

In the embodiment represented in this FIG. 1, the gear motors 10 and 11 are arranged facing one another, each one on one of the flanges 2, 3 respectively of the support structure and are fixed onto that face of these flanges which is opposite the one facing the column body, by any suitable means such as mounting bolts 10b and 11b, respectively.

Moreover, these gear motors are arranged near the end of the flanges 2 and 3 which is closest to the steering column, whereas the column body 7 is articulated near the other end of the flanges.

Each flange may therefore include, between these two ends, means for absorbing impact energy, which are denoted by the general references 12 and 13. These means for absorbing impact energy may consist, for example, of preferential deformation zones for these flanges.

The column body 7, and more particularly the body portion 7a in the embodiment represented in this FIG. 1, may also include such means for absorbing impact energy.

In the example illustrated in this FIG. 1, the column body portion 7a is in fact divided into two sections which are mounted so that they can be forced telescopically one into the other, at 7c, facing the means for absorbing impact energy of the flanges.

These various means for absorbing energy allow the column assembly to deform when the driver of the vehicle, for example, collides with the steering wheel during a driving accident.

The means for adjusting the axial position of the corresponding body portion 7a and therefore of the steering wheel may consist of means having a configuration similar to that of the corresponding means described and represented in the document EP-A-0,444,994 mentioned previously.

Indeed, these means may consist of an output pinion of an electric gear motor, adapted to interact with a rack articulated about this pinion and connected in an articulated manner to the corresponding portion of the body.

The axial position adjustment of the steering wheel is therefore provided by movement of this body portion and of the shaft portion which carries the steering wheel, respectively, in the other body portion and with respect to the other shaft portion.

Indeed, it is understood that if there is brought about a linear movement of the rack and therefore of the body portion 7a, the latter moves slidingly in the body portion 7b, that is to say in the bearing block for guiding and for articulating the latter on the flanges of the support structure.

Moreover, due to the presence of the means 9 for axially blocking the shaft portion 4a which carries the steering wheel 4a in the corresponding body portion 7a, this shaft portion 4a is also driven in linear movement and slides, for example, about the other shaft portion 4b which is stationary.

Figure 2:
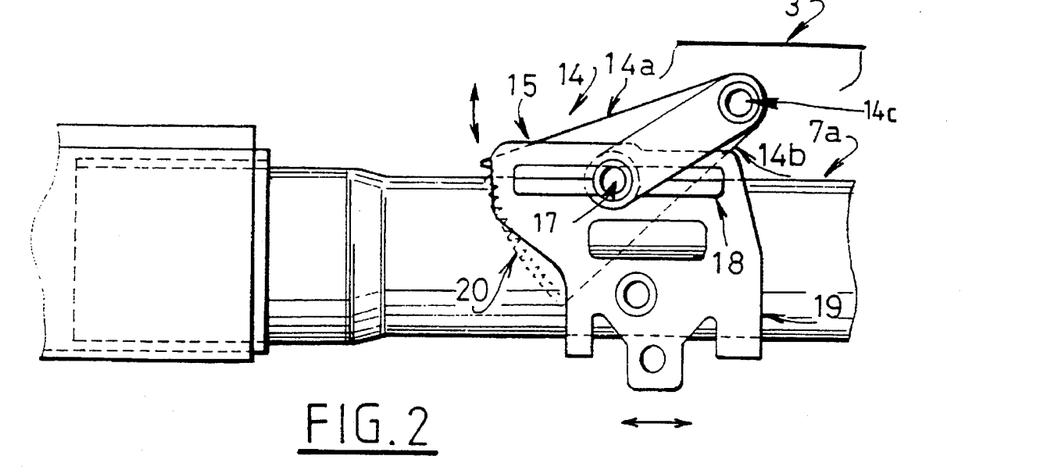
FIGS. 2 and 3 represent respectively side and plan view of means for adjusting the angular position of a steering wheel, entering into the constitution of an assembly according to the invention.
Figure 3:
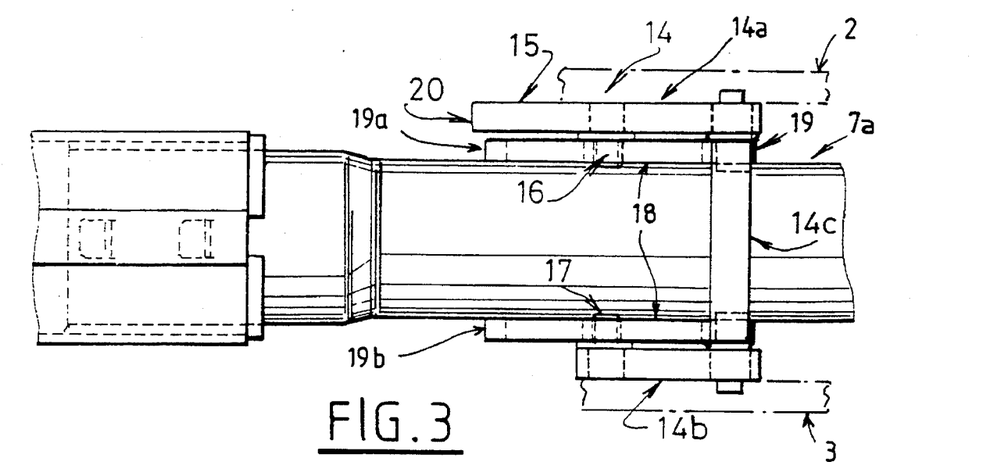

As can be seen more clearly in FIGS. 2 and 3, the means for adjusting the angular position of the steering wheel for their part comprise a structure 14 for suspending the body portion 7a associated with the shaft portion 4a which carries the steering wheel, from the support structure 1.

This suspension structure 14 is articulated about a more-or-less horizontal axis on the support structure 1, and more particularly on at least one of the flanges, for example 3, of the latter.

This suspension structure 14 is mounted so that it can move angularly under the control of movement means 15 interacting with the electric gear motor 11 for adjusting the angular position of the steering wheel, in order to adjust the angular position of this body portion 7a associated with the shaft portion 4a which carries the steering wheel.

This body portion 7a and this suspension structure 14 can be moved not only angularly, but also in translation, one with respect to the other, in order to allow an angular adjustment and/or an axial adjustment of the position of the corresponding body portion, and therefore of the steering wheel, by activating one and/or the other of the adjustment gear motors.

Indeed, it is be understood that in order to allow an axial adjustment and an angular adjustment of the position of the steering wheel, it is necessary to allow a translation between the column body portion 7a and this suspension structure 14 which is articulated on the support structure.

In the embodiment represented in these FIGS. 2 and 3, this suspension structure is in the overall form of a U-shaped fitting interposed between the portion 7a of the body and the flanges of the support structure 1 and including two operating arms 14a, 14b arranged on either side of this body portion 7a and fixed to a operating rod 14c articulated between (i.e., pivotally mounted in) the two flanges 2, 3 of the support structure. Each operating arm includes a member 16, 17 for suspending the corresponding body portion 7a.

Of course, just one operating arm articulated on one of the flanges of the support structure may equally well be used as a suspension structure.

In the embodiment described with reference to FIGS. 2 and 3, each suspension member 16, 17 is mounted slidingly in a slot, for example 18, of the corresponding body portion 7a and more particularly of a fixture 19 of the latter.

Of course, also, these suspension members 16 and 17 may be formed by a suspension rod extending between the two operating arms 14a and 14b and mounted so that it can move slidingly in the one same slot of the fixture of the corresponding portion of this body.

The operating rod 14c is articulated at each of its ends on the corresponding flange of the support structure, by any suitable means, such as pivoting bushings formed integrally with these flanges.

Moreover, one of the operating arms, and for example the operating arm 14a represented in FIG. 3, includes a portion of sector gear 20, forming movement means and adapted to interact with the output pinion, for example of the gear motor 11 represented in FIG. 1, in order to bring about, depending on the direction of rotation of this gear motor, that is to say depending on the direction of powering the latter, an upwards or downwards angular movement of the suspension structure 14 and therefore of the corresponding body portion 7a and of the steering wheel.

As has been indicated previously, this suspension structure 14 may be arranged between the flanges of the support structure 1 and the column body 7.

Figure 4:
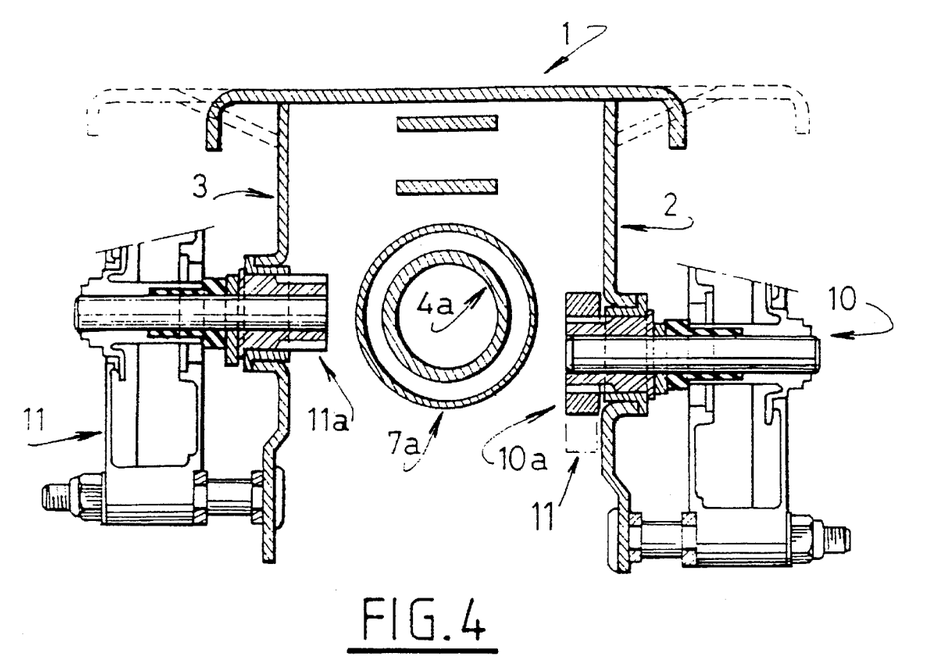
FIG. 4 represents a sectional view taken along the line IV—IV of FIG. 1, illustrating the installation of electric adjustment gear motors, entering into the constitution of an assembly of the invention.
Figure 5:
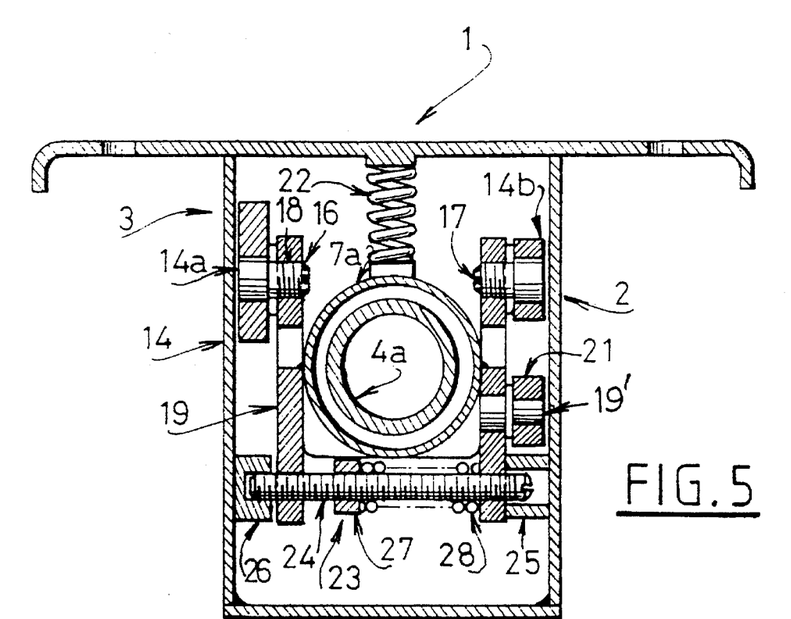
FIG. 5 represents a sectional view along the line V—V of FIG. 1, illustrating the installation or position-adjustment means, entering into the constitution of an assembly according to the invention.

In this case and as can be seen in FIGS. 4 and 5, the output pinions 10a and 11a of the gear motors 10 and 11 may project from the face of the corresponding flange 2 or 3, which face is opposite that face onto which the corresponding gear motor 10 or 11 is fixed, in order to be able to interact with the rack for adjusting the axial position and with the sector gear for adjusting the angular position, respectively, of the corresponding body portion.

Indeed, it can be seen in these figures that the output pinion 11a of the gear motor 11 for adjusting the angular position of the steering wheel may be adapted to interact with the portion of sector gear provided at one of the ends of the operating arm 14a so as to allow the angular position adjustment, whereas the output pinion 10a of the gear motor 10 for adjusting the axial position of this steering wheel may be adapted to interact with a rack 21 for axial movement, also connected in an articulated manner to the fixture 19 of this column body portion, to allow the axial adjustment of the position of this body portion and therefore of the steering wheel.

Of course, the axis of articulation of this suspension structure may be arranged above or below the corresponding body portion, in the case where an articulation rod and a suspension rod are used.

However, in the case where just one operating arm is used as a suspension structure, this axis may be arranged at any suitable point on these flanges.

Of course, also, other means for moving the suspension structure may be envisaged.

Moreover, means for stressing this column body portion 7a in the support structure 1 in order to take up the various assembly and operating clearances of the column assembly may also be provided.

Thus, for example, elastic means 22 may be provided, one end of which bears on the column body and more particularly on the body portion 7a and the other end of which bears on the upper part of the support structure 1, in order to take up the corresponding clearances.

Moreover, other elastic means, such as means 23 represented in this figure, may also be provided so as to obtain a takeup of the lateral clearances between this body portion 7a and the flanges 2 and 3 of the support structure, and so as to obtain correct guidance of this body portion as it moves in the support structure.

These means comprise, for example, a threaded rod 24 extending into corresponding holes of the fixture 19 so as to move the fixture between the flanges 2 and 3, and the ends of the threaded rod are provided with attached runners 25 and 26 for guiding this body portion, bearing on the flanges 2 and 3 of the support structure, the threaded rod 24 including a nut 27 for adjusting the stress level of a spring 28, one end of which bears on this nut and the other of which bears on the fixture of this body portion, in order to take up these lateral clearances.

Of course, other embodiments of these means for taking up clearances may be envisaged.

Figures 6, 7:
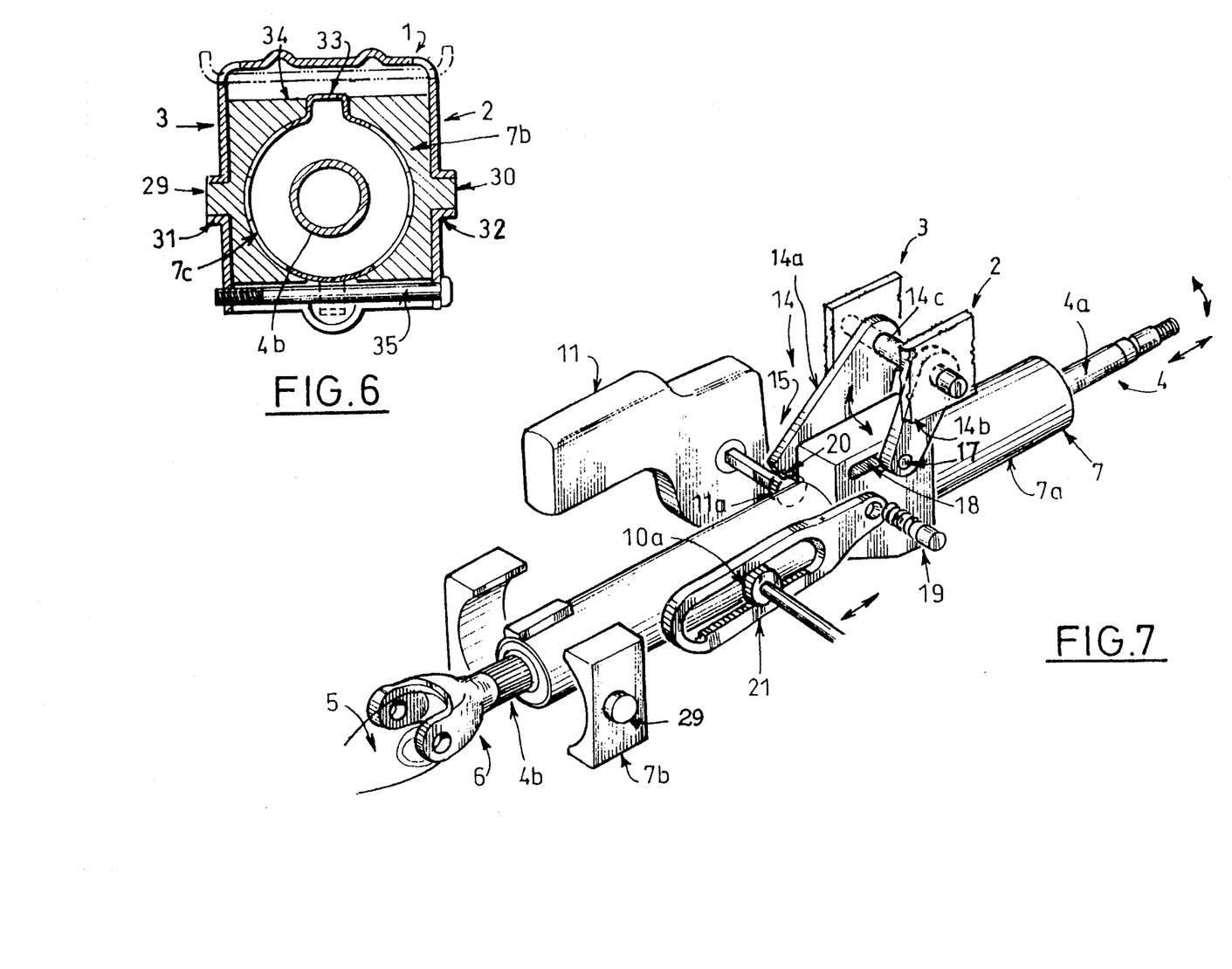
FIG. 6 represents a sectional view taken along the line VI—VI of FIG. 1, illustrating means for articulating a column body between flanges of a support structure, entering into the constitution of an assembly according to the invention.
FIG. 7 represents a diagrammatic perspective view of an assembly according to the invention, illustrating the installation of the various position-adjusting means.
Figure 8:
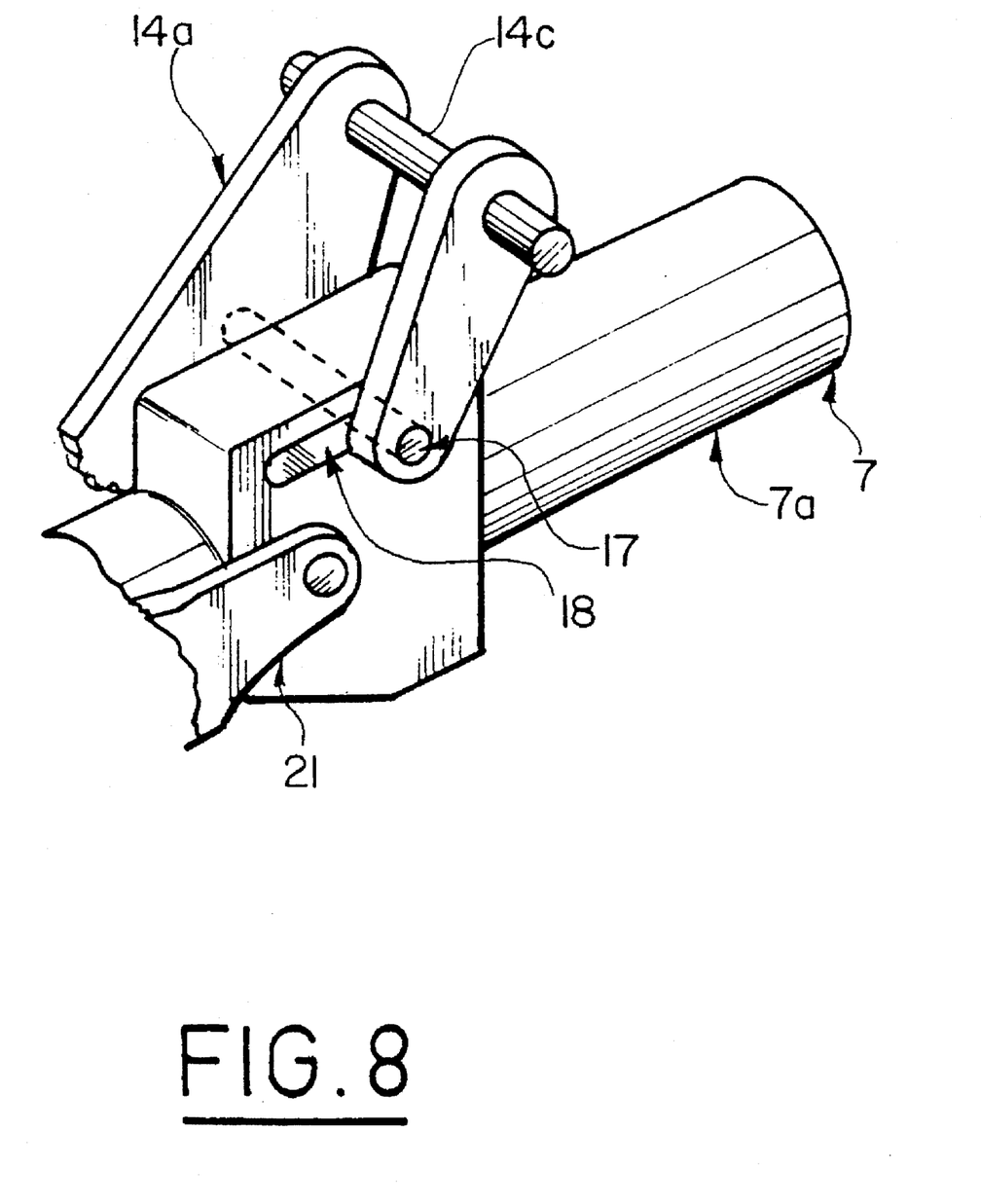

FIG. 6 represents an embodiment of the column body portion 7b articulated between the flanges 2 and 3.

This column body portion may, as has been mentioned previously, be in the form of a bearing block for guiding and for articulating the other body portion, and having, on its lateral faces, projecting parts 29 and 30 articulated in pivoting bushings 31 and 32 of the flanges 3 and 3, stemming from the one described in French Patent Application No. 92 02 594 filed on 4th Mar. 1992 in the name of the Applicant Company.

Indeed, this bearing block may be formed by a bearing bush for mounting the corresponding end of the other body portion 7a without clearance in the fixing structure 1, and more particularly in a stirrup-piece of the latter, formed by the upper part of the support structure 1 and the flanges 2 and 3 of the latter and having an overall U-shaped cross-section.

Complementary abutment means, formed for example by a projecting part 33 of the body portion 7c and a groove 34 for guiding this bearing bush 7b, may be used to prevent any angular movement of this body portion 7a with respect to the bearing bush in the case, for example, where position-locking means are associated with that shaft portion 4a which is associated with the body portion 7a.

Finally, means 35 for stressing the assembly comprising the stirrup piece and the bearing bush body and may also be provided in order to take up the clearances and to provide correct guidance of the body portion 7a.

These stressing means may, for example, be formed by a screw for moving the flanges 2 and 3 closer together.

Of course, the other features of the bearing block mentioned in document 92 02 594 may also be applied to this bearing block 7b.

The installation of the various position-adjustment means is illustrated diagrammatically in FIG. 7.

It is thus understood that the steering column assembly according to the invention offers a certain number of advantages as regards the simplicity of its configuration and its operation as compared with the various assemblies known in the state of the art.

This structure allows a weight saving and a reduced bulk whilst permitting accurate and reliable adjustments of the column assembly.

What is claimed is:

1. Position-adjustable steering column assembly, particularly for a motor vehicle, of the type comprising a column support structure (1) provided with two more-or-less vertical lateral flanges (2,3), a steering shaft (4) including two portions (4a, 4b), one (4a) of which carries the steering wheel and the other (4b) of which is connected to the rest (5) of the mechanism for steering the vehicle and which portions are mounted telescopically one in the other, so as to allow the adjustment of the axial position of the steering wheel, this shaft (4) being mounted so that it can rotate in a column body (7) capable of pivoting about a more-or-less horizontal axis (X—X) between the two flanges of the support structure (1) so as to allow the adjustment of the angular position of the steering wheel, this body including two portions (7a, 7b) which can be moved slidingly one in the other, one (7a) of which includes means (8, 9) for rotationally guiding and for axially blocking the shaft portion (4a) which carries the steering wheel and the other (7b) of which is articulated-between the flanges (2, 3) of the support structure, and position-adjusting means including an electric first gear motor (11) for adjusting the angular position of the steering wheel, and an electric second gear motor (10) for adjusting the axial position of the steering wheel, which are adapted so as to interact, on the one hand, with the support structure (1) and, on the other hand, with the body portion (7a) associated with the shaft portion (4a) which carries the steering wheel, in order to adjust the angular and axial positions of the steering wheel, wherein the adjustment means further comprise a structure (14) for suspending the said body portion (7a) associated with the shaft portion (4a) which carries the steering wheel, which portion is articulated about a more-or-less horizontal axis on the support structure (1) and is capable of moving angularly under the control of movement means (15) interacting with the electric gear motor (11) for adjusting the angular position of the steering wheel, in order to adjust the angular position of the body portion associated with the shaft portion which carries the steering wheel, this body portion (7a) and this suspension structure (14) being capable of moving angularly and/or in translation one with respect to the other, in order to allow an angular and/or axial adjustment of the position of the corresponding portion of the body, and therefore of the steering wheel, by activating one and/or other of said gear motors.

2. Assembly according to claim 1, characterized in that the suspension structure (14) is articulated on at least one of the flanges (2, 3) of the support structure.

3. Assembly according to claim 2, characterized in that the suspension structure (14) includes at least one suspension arm (14a) which is articulated on the said flange (3) and provided with a member (16) for suspending the corresponding portion (7a) of the body.

4. Assembly according to claim 2, characterized in that the suspension structure includes a fitting (14) of overall U-shape having two operating arms (14a, 14b) which are connected to a operating rod (14c) articulated between the two flanges (2, 3) of the support structure, each operating arm including a member (16, 17) for suspending the corresponding portion of the body.

5. Assembly according to claim 4, characterized in that the or each suspension member (16, 17) is mounted slidingly in a slot (18) of the corresponding portion of the body.

6. Assembly according to claim 4 or 5, characterized in that the members (16, 17) for suspending the operating arms are formed by a suspension rod extending between the arms and mounted slidingly in the same slot of the corresponding portion (7a) of the body.

7. Assembly according to claim 1, characterized in that the suspension structure is arranged between the support structure (1) and the corresponding portion (7a) of the body.

8. Assembly according to claim 7, characterized in that the gear motor (11) for adjusting the angular position is fixed onto the face of a flange (3), which face is opposite the one facing the body, and in that a portion of the movement means passes through the corresponding flange.

9. Assembly according to claim 3 or 4, characterized in that the movement means comprise an output pinion (11a) of the first gear motor (11), adapted to interact with a portion of a a sector gear (20) for angularly moving the suspension structure (14).

10. Assembly according to claim 9, characterized in that said portion of said sector gear (20) is provided at the end of the or of one of the operating arms (14a).

11. Assembly according to claim 1, characterized in that the first gear motor (11) for adjusting the angular position of the steering wheel is fixed onto one of the flanges (3), whereas the second gear motor (10) for adjusting the axial position of the steering wheel is fixed opposite it, onto the other flange (2) of the support structure.

12. Assembly according to claim 11, characterized in that the second gear motor (10) for adjusting the axial position of the steering wheel is fixed onto the face of the corresponding flange, which face is opposite the one facing the body, and in that the means for adjusting the axial position of the steering wheel include an output pinion (10a) of the second gear motor (10), projecting from the face of the corresponding flange, which face is opposite the one onto which the second gear motor is fixed and which is adapted to interact with a rack (21) articulated about this pinion (10a), and arranged between the corresponding flange (2) and the corresponding body portion (7a) and connected to this body portion, so as to allow the adjustment of the axial position of this body portion and therefore of the steering wheel.

13. Assembly according to claim 1, characterized in that the first and second gear motors (10, 11) for adjusting the steering wheel in angular and axial positions, are arranged near the end of the flanges which is closest the steering wheel, the column body being articulated near the other end of the flanges (2, 3), and in that the flanges (2, 3) include, between their two ends, means (12, 13) for absorbing impact energy.

14. Assembly according to claim 13, characterized in that the means for absorbing impact energy comprise preferential deformation zones (12, 13) for said flanges.

15. Assembly according to claim 13, characterized in that the column body (7) includes means for absorbing impact energy.

16. Assembly according to claim 15, characterized in that the means for absorbing impact energy of the body are formed by two sections of the body portion (7a) associated with the shaft portion which carries the steering wheel, which sections can be forced telescopically (at 7c) one into the other.

17. Assembly according to claim 7, characterized in that said assembly includes means for stressing the column body portion (7a) associated with the shaft portion which carries the steering wheel (4a), in the support structure (1), in order to take up the assembly and operating clearances.

18. Assembly according to claim 17, characterized in that the stressing means comprise elastic means (22) interposed between the upper part of the support structure (1) and said body portion (7a).

19. Assembly according to claim 17, characterized in that the stressing means comprise runners (25, 26) for guiding said body portion, which are forced to bear against the flanges (2, 3) of the support structure by the agency of elastic means (28).

20. Assembly according to claim 19, characterized in that the guide runners (25, 26) are arranged at the ends of a threaded rod (24) which is connected to said body portion and on which is provided a nut (27) for stressing a spring (28), one end of which bears on said nut and another end of which bears against the said body portion.

21. Assembly according to claim 1, characterized in that the body portion (7b) articulated on the support structure (1) includes a bearing bush for fitting the other body portion (7a) into said structure without clearance, said bearing bush including, on its lateral faces, means (29, 30) for articulation on the flanges.

22. Assembly according to claim 21, characterized in that the articulation means comprise projecting parts (29, 30) which are adapted to engage in pivot bushings (31, 32) of the flanges.

23. Assembly according to claim 21, characterized in that means (35) are provided for stressing the assembly comprising the support structure (1), the bearing bush (7b) and the column body portion (7a) associated with the steering shaft portion (4a) which carries the steering wheel.

24. Assembly according to claim 23, characterized in that the stressing means comprise a screw (35) for moving the flanges closer together.

\* \* \* \* \*